United States Patent [19]

Sutrina et al.

[11] 4,358,334

[45] Nov. 9, 1982

[54] FORMING AN INTEGRAL CLOSURE FOR A THERMOPLASTIC CONTAINER

[75] Inventors: Thomas A. Sutrina, Rockford, Ill.; R. Douglas Behr, Midland, Mich.

[73] Assignee: The Dow Chemical Co., Midland, Mich.

[21] Appl. No.: 255,601

[22] Filed: Apr. 20, 1981

Related U.S. Application Data

[62] Division of Ser. No. 149,861, May 14, 1980, Pat. No. 4,295,919, which is a division of Ser. No. 969,911, Dec. 15, 1978, Pat. No. 4,263,079.

[51] Int. Cl.³ .............................................. B32B 31/22
[52] U.S. Cl. ..................... 156/497; 156/498; 156/500; 156/244.24; 239/593; 239/DIG. 21; 239/589; 427/348; 15/306 A; 15/316 R
[58] Field of Search ................ 15/306 A, 316 R, 345; 427/348, 398.3, 374.3; 425/DIG. 102, DIG. 50; 156/497, 244.24, 91, 498, 500, 244.11, 244.15; 34/114, 120, 122; 239/589, 593, DIG. 21

[56] References Cited

U.S. PATENT DOCUMENTS

| | | | |
|---|---|---|---|
| 3,071,869 | 1/1963 | Latimer et al. | 34/122 X |
| 3,462,332 | 8/1969 | Goto | 156/500 X |
| 3,930,319 | 1/1976 | Coleman | 34/122 |
| 4,185,399 | 1/1980 | Gladish | 15/306 A X |

*Primary Examiner*—Marion Mc Camish
*Assistant Examiner*—Alexander S. Thomas
*Attorney, Agent, or Firm*—Lloyd E. Hessenaur, Jr.

[57] ABSTRACT

An improved high speed cast process for fusing fasteners, with strips of film at their base, to separately extruded film or sheet stock for making containers with integral closure means. The process makes available multiple sets of male and female fastener elements, with variable spacing, in a single extrusion operation. The apparatus is configured so that adhesion between the fastener elements and the film or sheet occurs very closely to the die lips before significant cooling of the extrudate occurs. Containers with improved profiles are obtained because the base permits the profiles to remain relatively rigid during closing and opening.

1 Claim, 12 Drawing Figures

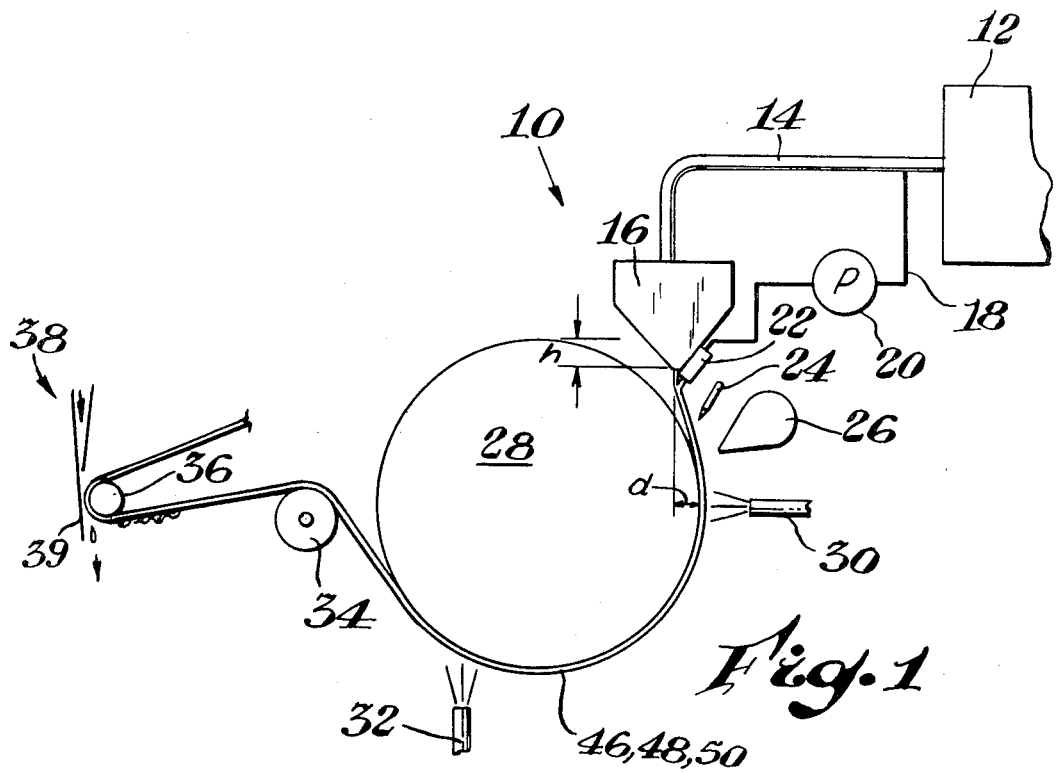
Fig. 1
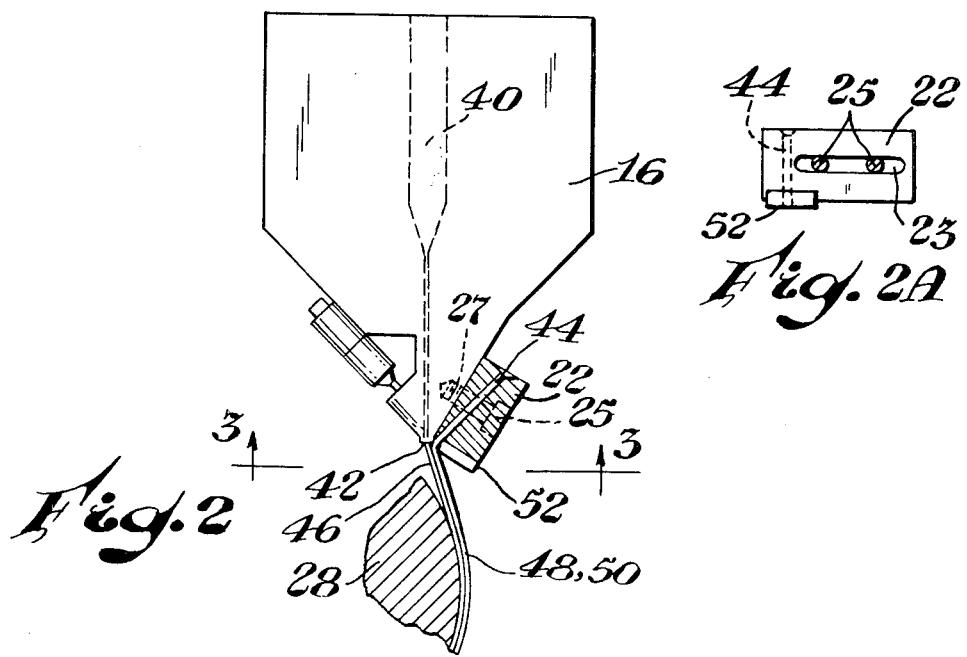
Fig. 2
Fig. 2A

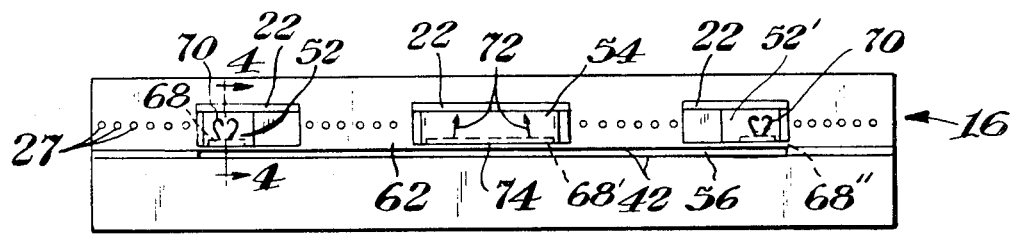
Fig. 3
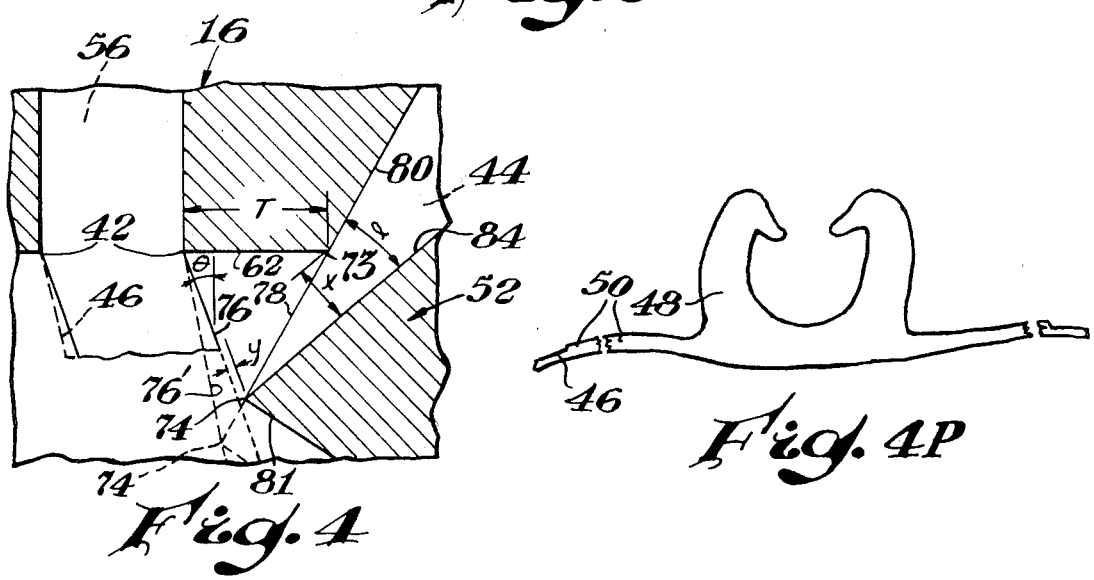
Fig. 4
Fig. 4P
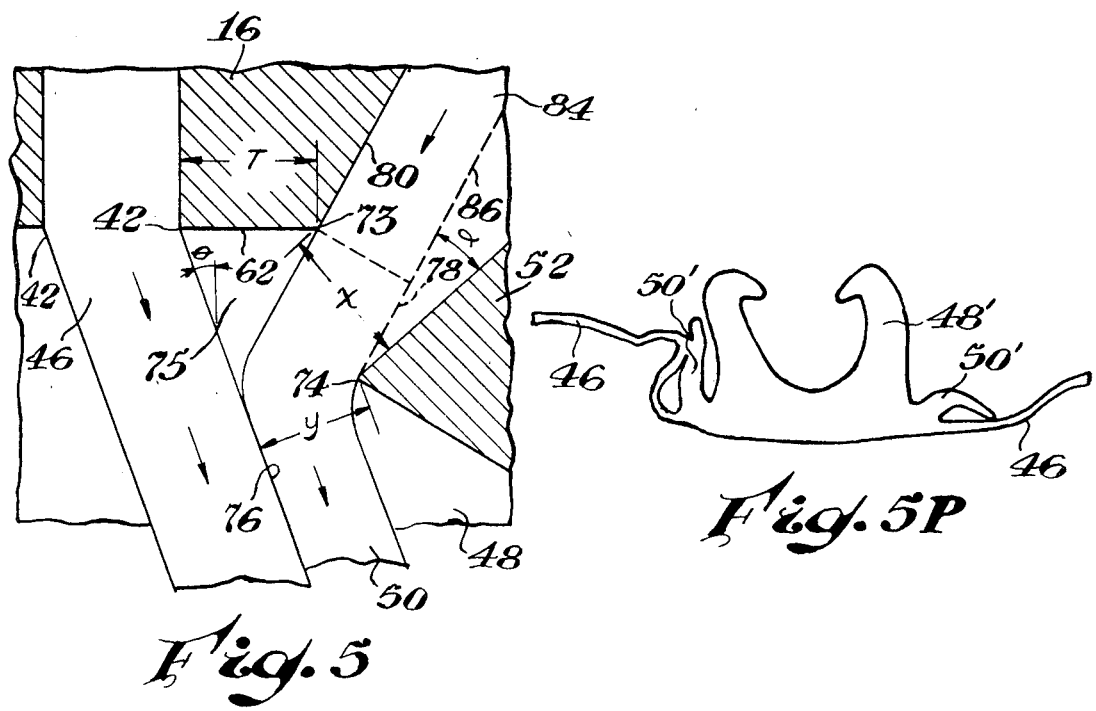
Fig. 5
Fig. 5P

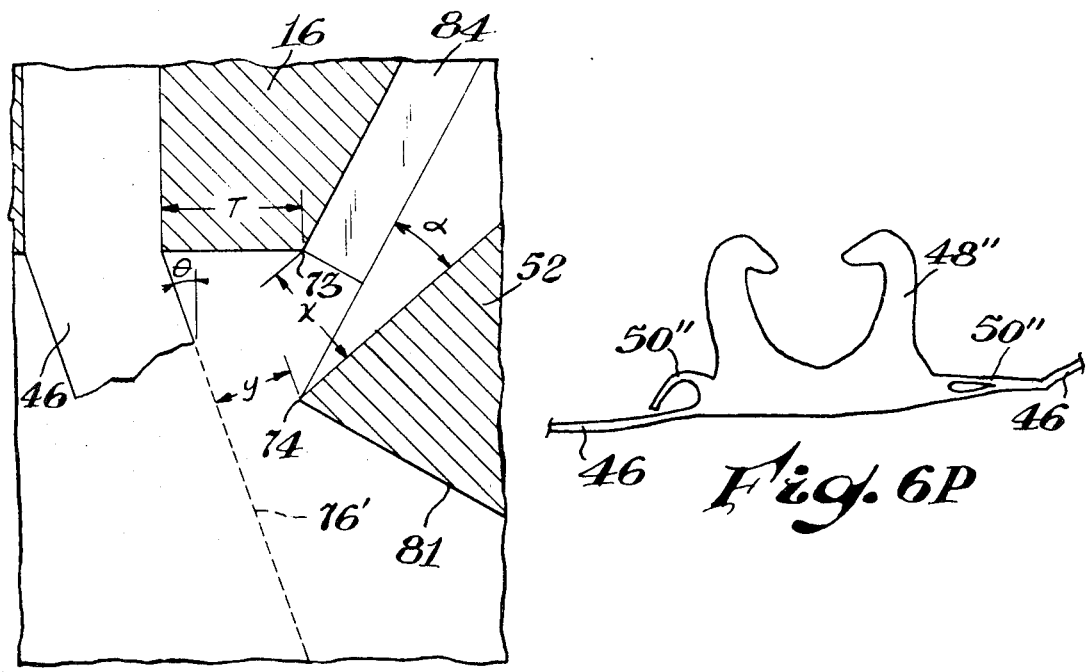
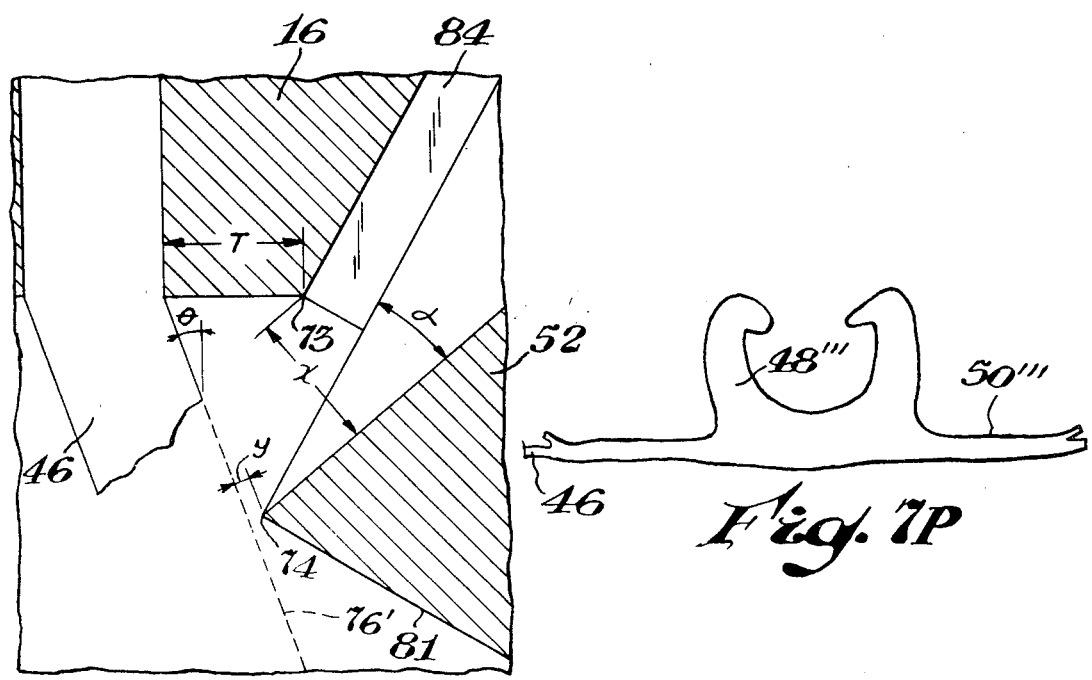

FORMING AN INTEGRAL CLOSURE FOR A THERMOPLASTIC CONTAINER

CROSS-REFERENCE TO RELATED APPLICATION

This is a divisional of application Ser. No. 149,861, filed May 14, 1980 now U.S. Pat. No. 4,295,919, which in turn is a divisional of application Ser. No. 969,911 filed on Dec. 15, 1978 now U.S. Pat. No. 4,263,079.

BACKGROUND OF THE INVENTION

This invention relates to the method of inline forming of integral fasteners with film or sheet stock to be made into bags or other containers which are closable by the fastener elements. For a considerable period of time, bags with integral fasteners have been made by the blown film process similar to that taught in U.S. Pat. No. 3,340,116, for example. Here the fastening elements are extruded from the same polymer melt streams through an annular die containing the fastener extrusion orifices. Another technique for manufacturing such integral zippers is that taught, for example, in U.S. Pat. No. 3,462,332. This patent discloses a cast film process wherein the fastener elements are extruded separately from the film and are thereafter joined with the film by being brought together against a rotating cooling roll while the film and fastening elements are still in a fusible state.

While both the prior art blown film and cast film processes have produced commercial products, those made by the relatively faster cast film process have lacked certain advantages. The ability of fastener elements to resist rotation to obtain better interlocking remained a desired end. The ability to readily and controllably make thickened bases for the fastener elements yet maintain high production speeds, with the ability to make multiple and variable sized bags out of a single cast film, all remained a need until the present invention. While U.S. Pat. Nos. 3,198,228 and 3,338,284 show thickened bases, these are not found in a cast process. Also to be desired was to have cast die lips of sufficient thickness so as not to be susceptible to damage. The reliable high speed process for producing superior integral fastener elements taught by this invention meets the needs left unanswered by the prior art.

SUMMARY OF THE INVENTION

This invention involves a high speed cast process for making an improved film or sheet product with integral fastening members. The process leads to flexibility and hardware and product improvements heretofore unknown to the art. The present invention permits forming of a thickened base for the fastener elements in order to permit more erect elements which do not bend or rotate out of alignment when it is desired to interlock or disengage the same. In effect, extra base strips are extruded together with the fastener elements and are joined to the separately extruded film or sheet close to their die exits. The fastener elements and bases are joined to the film or sheet stock at a desired disposition to permit ready fusing of the thickened base to the film or sheet stock, which is in turn formed into the desired container. By this invention, location and width of the base strips can be changed and moved with the fastener elements without affecting the film or sheet extrusion. The thickness of the base strips extruded with the fasteners are independent of the film or sheet stock thickness. The present invention also permits the production of two or more containers of varying size on the same film extrusion since the thickened base strips can be a base for a plurality of fastener elements varyingly spaced apart. The sheet or film die lips can remain wide and therefore less susceptible to damage and still not interfere with adhesion between the fastener elements and the film or sheet stock.

BRIEF DESCRIPTION OF THE DRAWINGS

FIG. 1 is a schematic elevational view showing an extrusion arrangement for integrally forming fastener elements on film or sheet according to the principles of the present invention;

FIG. 2 is an enlarged schematic elevational view of a sheeting die and fastener, die block and plate as illustrated as part of the extrusion arrangement in FIG. 1;

FIG. 2A is a frontal view of the die block of FIG. 2 showing a mechanism for adjusting the die blocks location;

FIG. 3 is an enlarged schematic bottom view looking in the direction of line 3—3 of FIG. 2 showing the fastener die blocks and plates as associated with the film or sheeting die and particularly illustrating the fastener die slots and the sheeting die orifice;

FIG. 4 is a greatly enlarged cross-sectional view of the film or sheeting die and fastener die plate taken along section 4—4 of FIG. 3 illustrating the extrusion of the film or sheeting stock as it is combined with a fastener element and its base, a modified arrangement of a fastener die plate being shown in dotted lines;

FIG. 5 is a view like FIG. 4 only showing the fastener die plate spaced from the film or sheet die by an intervening shim;

FIGS. 6 and 7 are similar to FIG. 5 only with the location of the die plate changed; and FIGS. 4P, 5P, 6P and 7P are greatly enlarged schematic cross-sections of representative female profiles formed using the arrangements illustrated in FIGS. 4, 5, 6 and 7, respectively.

DETAILED DESCRIPTION OF THE DRAWINGS

Apparatus 10 illustrated in FIG. 1 comprises a conventional screw extruder 12. Extending outwardly from extruder 12 is an extruder pipeline 14 feeding resin to a main sheeting or film die 16. For convenience, die 16 will hereinafter be called film die even though it is capable of extruding either film or sheet usable in this invention. Feeding from extruder pipeline 14 is a second extruder pipeline 18 which, through melt pump 20, supplies resin to a plurality of fastener die blocks 22. Each fastener die block 22 and die plate 52 provide an extrusion path for extruding fasteners which combine with the film leaving the film die 16, as described in more detail hereinafter. This apparatus permits the extrusion and fusion of fastener members with strips of film at their base to uniform sheet or film extruded from the film die 16. The fastener members, base and film elements being generally represented by the reference characters 48, 50, 46, respectively, in FIGS. 1 and 2. These elements combine extremely close to the extrusion die lips, the joining locations illustrated in FIGS. 1 and 2 being exaggerated only to show that they extrude as separate components. The apparatus is capable of making cast film with multiple sets of generally U-shaped and generally arrow-shaped fastener members, shaped like those shown in U.S. Pat. No. 3,340,116, for example, integrated with the thickened base strips of film later described in detail.

An air jet 24 and/or air knife 26 can be used to assure good contact of the film, fastener elements 46, 48 and 50 with a chill roll 28 while screens or shields (not shown) can optionally block air flow in front of each fastener member to prevent distortion of the malleable extrusion. The air jets above the air knives pin the edges of the drawn film extrusion to the chill roll to reduce narrowing of the film and thickening of the film edge. Below air knife 26 preferably is located water jets 30 which are aligned with each of the fastener members to cool the same. It may be desirable to add a second water jet 32 located on the side of the chill roll opposite from the air knife to be certain that the fasteners are fully cooled before the same are wound.

Preferably, the film/fastener elements 46, 48 and 50 are taken off the chill roll and passed across the grooved roll 34, which can contain water suction means, and then passed over a second take-off roll 36 which can contain a vacuum assist to hold the film closer thereto. Immediately adjacent the roll 36 is a water blow-off air jet 38 to remove any excess water remaining on the extruded film fastener elements after they leave roll 36. The lower end of the jet mechanism contains a flange or tongue 39 extending below the vertical tangent point of roll 36. The air jet (see arrows) makes tangential contact with the extruded film/fastener combination. As shown in FIG. 1, the film/fastener combination is received along the bottom of roll 36, goes around the left vertical face of the roll and leaves from the take-away or upper side of the roll. The nozzle of the air jet apparatus, shown where the sides of the apparatus most closely approach one another just before extension 39, is located closely adjacent the take-away side of the roll 36. The tongue 39 extends from the nozzle over and beyond the film/fastener combination receiving side of the roll 36. The air jet velocity between the tongue and roll atomizes the water which separates from the film along the path of the tongue. From the roll 36, the film/fastener combination is taken to a wind-up roll or to a mechanism for actually forming containers from the film/fastener combination.

FIGS. 2, 2A and 3 show more detailed views of the sheeting die 16 and fastener die block 22 illustrated in FIG. 1. Polymer entering channel 40 from pipeline 14 extrudes outwardly from film slot 56 past corners 42 of die lip 62 adjacent the lower end of the sheeting die 16. Fastener die block 22 is secured to the side of the film die 16 with die bolts 25 through slot 23. Die plate 52 is bolted to the bottom surface of die block 22. A plurality of die bolt holes 27 allow varying placement of the die blocks and the slots 23 in the die blocks allow adjustment of the die block about each bolt. Die block 22 is placed so that the lower edge 74 of die plate 52 is below the die lip 62 of film die 16. Resin extruding through channel 44 disposed angularly within fastener die block 22 and through profile orifices 68 and 70 in die plate 52 meets with the film 46 immediately adjacent the lowermost extent or die lips 62 of the film die thereby joining the fastener members 48 and their bases 50 to form the film/fastener combination 46, 48 and 50. The angular disposition of the exit of channel 44 increases the acuteness of the angularity of the extrudate issuing therefrom so as to increase the closeness of the joining of the film/fastener combination.

Fastener die block 22 carries female fastener die plates 52 and 52', having left and right hand female profile orifices 70, and male die plate 54 having left and right hand male profile orifices 72. These are seen in FIG. 3 which is a view looking at the face of fastener die blocks 22 as secured to film die 16. Male and female profiles 48 exit from orifices 70 and 72 and film strips forming base 50 exit from orifices 68, 68' and 68" together with profiles 48. The film from film die 16 exits from film slot 56 and is joined with the profiles and their base 50 immediately adjacent die lip 62.

FIGS. 4 and 5 are even more greatly enlarged detailed showings of the arrangement of the film die 16 and representative fastener die plate 52 schematically showing how closely it is believed the film/fastener elements 46, 48 and 50 unite adjacent to the die lip 62. If film die 16 and fastener die plates 52 of FIGS. 4 and 5 are properly arranged with respect to one another, they will produce a satisfactory film/fastener combination typified by FIG. 4P. If not, an unsatisfactory film/fastener combination as typified by FIG. 5P can result.

The fundamental problem in extruding fastener profiles on cast film is to obtain satisfactory adhesion of the profile to the film while using a practical arrangement of apparatus. It has been discovered that the closer the fastener components can be joined to the film as the latter issues from the film die, the better the chances are that satisfactory adhesion will occur, particularly at high speed extrusion rates. FIG. 4 illustrates a particular arrangement which has been found to permit high speed extrusions, in excess of 200 feet per minute, while obtaining satisfactory film/profile adherence as typified by FIG. 4P.

To bring the extrusion of the profile or fastener base 50, through channel 44, so that it joins film 46, issuing from channel 56, closely adjacent die lip 62, it is desirable to make the distance "T" of the die lip as short as practical and to have the base 50 angularly disposed towards film 46. The distance T should not be so short, however, that the die lip 62 forms a knife edge easily subject to damage. For the working embodiments, a relatively wide distance T of from about "0.020" to "0.030" has been found practical because of the angularity of extrusion built into the apparatus by this invention.

The extrusion of film 46 can also be angled towards the extrusion of the profile base 50 by the relative location of the extrusion channel, as it exits at end corners 42, with respect to the chill roll 28. For example, by locating extrusion channel ends 42 back a distance "d" from the vertical tangent point of chill roll 28, and a distance "h" from the horizontal tangent point of chill roll 28 (FIG. 1), the angle $\theta$ of the film extrudate 46 with respect to the vertical can be varied.

Likewise, by having an angular face 80 on the film die 16, along which surface 78 of the die plate 52 can slide up and down before being clamped, as shown in FIGS. 2 and 2A, leading edge 74 of die plate 52 can be located as desired with respect to adjacent film surface 76. This, therefore, determines not only the angular disposition of fastener base 50 with respect to film 46, but also the closeness of the two when they engage. The closeness between the surface 76, shown extended as surface 76' by dotted line in FIG. 4, and die plate leading edge 74 is designated as distance "y". The gap distance between the face 80 of the film die 16, at the edge 73 of die lip 62 from the inner face 84 of channel 44 is designated "x".

The bevel or angle α is the angular relationship between faces 80 and 94.

Several runs were made using the die arrangement shown in FIG. 4 to test the variables as they may affect adhesion. In some cases the resin was varied, in others the die lip distance T was varied, the angle θ varied by changing distances d and h, the bevel angle α was varied, and the gap distance x was varied. The resins used were low density polyethylene resins commercially available from The Dow Chemical Company. The successful runs are shown in Table I.

TABLE I

| Run | Dow Designation | Resin Melt Index | Density (g/cc) | "T" Width of Die Lip (in.) | d (in.) | h (in.) | Bevel <α(°) | "x" Min. gap for Adhesion (in.) |
|---|---|---|---|---|---|---|---|---|
| 1 | PE 747 | 6 | .922 | .026 | 1.9 | 4.4 | 30 | .013 |
| 2 | " | 6 | .922 | .026 | 3.3 | 3.0 | 30 | .013 |
| 3 | " | 6 | .922 | .030 | 2.5 | 4.2 | 20 | .013 |
| 4 | " | 6 | .922 | .030 | 2.5 | 4.2 | 30 | .014 |
| 5 | " | 6 | .922 | .030 | 2 | 4.5 | 20 | .013 |
| 6 | " | 6 | .922 | .030 | 2 | 4.5 | 30 | .015 |
| 7 | " | 6 | .922 | .026 | 1.9 | 4.5 | 30 | .013 |
| 8 | " | 6 | .922 | .026 | 0.0 | 6.5 | 30 | .013 |
| 9 | PE 641 | 2 | .922 | .026 | 1.9 | 4.5 | 30 | .012 |
| 10 | PE 647 | 6 | .923 | .026 | 1.9 | 4.5 | 30 | .013 |
| 11 | PE 747 | 6 | .922 | .026 | 1.9 | 4.5 | 45 | .013 |
| 12 | " | 6 | .922 | .020 | 2.0 | 4.5 | 30 | .014 |

These runs produced fastener female profiles 48 and integrated bases 50 which adhered well to the film 46 typified by those shown in FIG. 4P. While female profiles are shown for convenience, it should be appreciated that male profiles would be similarly formed. When the gap x was reduced below that indicated in Table I unsatisfactory adhesion occurred, such as illustrated in FIGS. 5P or 6P, for example. Curiously, in these runs it was found that gap x always had to exceed 0.011 inch to provide a possibility of satisfactory adhesion even though other factors were varied. In all the runs shown in Table I, the bottom edge 74 the die plate 52, was located below the bottom, die lip 62, of the film die. Without this disposition, satisfactory adhesion was not found. For example, a run was made under the same conditions as Run 7 of Table I only with the gap dimension x set at 0.020, to provide the best chance for adhesion, but with the bottom edge 74 of the die plate being flush with the die lip 62 of the film die. Unsatisfactory adhesion resulted. It does not appear to matter whether bottom surface 81 of the die plate is angularly or horizontally disposed from edge 74.

Additional runs were made to determine the possible effect of the distance "y" between the edge 74 of the die plate 52 and the projected surface 76' of the film 46 based on a fixed angle θ even though edge 74 might cause interference with the projected surface 76'. Such is shown in FIG. 4 where dotted edge 74 is past projected surface 76' from the film 46 shown in solid lines and is pushed back to the film 46 position shown in dotted lines by projected surface 76'. Actually dotted or phantom film 46 would be pushed back even further by base 50 passing between edge 74 and film surface 76. A similar situation would occur in FIG. 7 also where distance "y" is insufficient to allow clearance of base 50.

In these additional runs, the resin was the same, the width of channel 56 was 0.020 inch, distance T was 0.026 inch, angle α was kept at 20°, and angle θ was kept at 19°, with d=1.9 inches and h=4.5 inches. Operating details were as follows but only a single male and a single profile were run:
Material for film and zippers: Dow PE 747
Extruder: 3½ inch by NRM, Incorporated Extruder Temps.
    Cylinder: [Rear] (1) 280° F. (2) 390° F. (3) 460° F. (4) 420° F. [Front]
    Die Temp: 240° C. middle and ends
    Melt Pumps and Zipper Manifold: 240° C.
    Transfer Lines:
        Ext. to Pump: 240° C.
    Male and Female: 240° C.
Film Take-away Speed: 210 FPM
Extruder Speed: 45 RPM
    Amps: 22
    Press: 1150 PSI
    Melt Temp: 418° F.
Melt Pump Speed: 27.1 RPM
    Press: 1620 PSI
    Melt Temp: 445° F.
Chill Roll Diameter: 24 inch
    Speed: 210 FPM
    Temp: 48° C.
Air Knife Pressure: 11 inches H$_2$O
    Distance to Die: 4.8 inches
    Distance to Chill Roll: 0.25 inch
Air Jet Press: 7 psi
    Female Jet Size: 0.008 inch
        Distance from Die: 3.2 inches
    Male Jet Size: 0.0020 inch
        Distance from Die: 3.0 inches
Water Jets
    Female Jet Size: 0.0030 inch
        Distance from Die: 6.2 inches
        Flow Rate: 4.4 gallons/hour
    Male Jet Size: 0.0020 inch
        Distance from Die: 7.0 inches
        Flow rate: 2.4 gallons/hour The other conditions were varied, however, as illustrated in FIGS. 5, 6 and 7. In each of these cases, a shim 84 was inserted to permit greater variation in the gap x and the location of die plate edge 74, i.e., dimension y. The variables are found in Table II, the width of shim 84 being the distance between face 86 and face 80 as shown in FIG. 5.

TABLE II

| Run | Width of Shim Inches | Gap x | Distance y |
|---|---|---|---|
| FIG. 5 | 0.015 | 0.020 | 0.016 |
| FIG. 6 | 0.010 | 0.016 | 0.012 |

TABLE II-continued

| Run | Width of Shim Inches | Gap x | Distance y |
| --- | --- | --- | --- |
| FIG. 7 | 0.010 | 0.020 | 0.002 |

The profile achieved with the run of FIG. 5 is represented by FIG. 5P, FIG. 6 by FIG. 6P and FIG. 7 by FIG. 7P. The adhesion of base 50' to film 46 as shown in FIG. 5P leaves large holes or unadhered sections and results in a clearly unsatisfactory profile 48'. The adhesion shown between base 50'' and film 46 shown in FIG. 6P is beginning to improve, at least on one side, but profile 48'' still remains unacceptable because of the poor adhesion on the other side. Note that distance y is decreased in the FIG. 6 run as compared to the FIG. 5 run. As distance y is decreased even further, as in the FIG. 7 run, adhesion between base 50''' and film 46 becomes greatly improved. Profile 48''' is satisfactory for commercial purposes as adhesion occurs over at least 90 percent of the base width. Additional runs where distance y was reduced further, even to a negative dimension, i.e., as shown in phantom in FIG. 4, with all other conditions being the same as run FIG. 7, found adequate adhesion and produced satisfactory profiles.

Also viewing FIGS. 4 to 7 and 4P to 7P, it is observed that in these particular arrangements the edge 74 of the die plate not only is below but is located laterally inwardly toward film surface 76 as respects edge 73 of the film die for satisfactory adhesion to occur (FIGS. 4, 4P, 7 and 7P). Where edge 74 is located outwardly of edge 73, as shown in FIG. 5, or even directly below edge 73, as shown in FIG. 6, unsatisfactory adhesion occured (FIGS. 5P and 6P, respectfully) in these particular embodiments of the invention. It appears that where edge 74 is located both below and inwardly of edge 73, the polymer stream through channel 44 is urged towards die lip 62 and film 46 to achieve early joining.

From the various runs illustrated by Tables I and II, it appears that satisfactory profiles can be extruded onto cast film at high speeds, even with a wide die lip if the bottom of the fastener die plate is located below the bottom of the film die, the gap x is sufficiently large, and the distance y is not too great so that combining of the profile with the film can occur closely adjacent the die lip. In fact, the combining occurs so closely that it is not detectable by the naked eye. It is not known what actually occurs in area 75 between base 50 and film 46 or of what size, if any, it may be. Under these conditions the base 50 has excellent adhesion to the film surface 76. These runs had profiles 48 of about 52 mils in height. Equally good results were obtained with profiles of 62 mils in height.

Once a satisfactory profile has been formed with the film, the film can be cut and sealed to form containers in the conventional manner. The arrangement of FIG. 3 makes possible two strips of bags because it contains two sets of male and female profiles. Other possible combinations of profiles and spacing of profiles on a single film can be achieved by the arrangement of this invention.

The present invention has several apparent advantages over the prior art. It makes possible the forming of fastener members on cast film at higher speeds than heretofore possible. It permits forming of a base for the fastener member in a cast process so as to prevent a more rigid, relatively non-rotatable profile facilitating interlocking. It permits a relatively wide film die lip so that the die lips are less subject to damage than if they were knife edge narrow without sacrificing adhesion between the profile and film stock. It permits variation in the base and profile since these are formed from a separate polymer source, either through its own meter pump even if from the same extruders or from a separate extruder, making possible profiles of different materials than the film stock. It makes possible the production of two or more containers on the same film extrusion since the thickened base can be the base for two fastener members each strong enough to be pulled on when disengaging the fastener members. It also makes possible varying locations and numbers of profiles on a given film extrudate.

While certain representative embodiments and details have been shown for purposes of illustrating the invention, it will be apparent to those skilled in the art that various changes in applications can be made therein without departing from the spirit and scope of the invention. For example, the film or sheet stock and/or fastener members and bases can be made of various other resin materials, the size, color and shape of the components can be varied, the number of fastener members extruded onto a film or sheet base can vary, the actual design and configuration of the container can vary, from flexible bags to rigid containers, and equivalent hardware can be substituted.

Accordingly, what is claimed as new is:

1. An apparatus for forming an integral thermoplastic fastening means on a cast film or sheet, said apparatus comprising means for extruding and joining said fastening means and said film or sheet, means for cooling said joined fastening means and said film or sheet combination, said cooling means including water impinging upon said combination, means for passing said combination around a roller, the part of said roller receiving the combination being the combination receiving side, the part of the roller from which the combination leaves being the combination take-away side, an air jet apparatus having a nozzle located closely adjacent the take-away side of the roller, a tongue extending from said air jet apparatus beyond said nozzle over the combination receiving side of said roller positioned so as to direct air from said nozzle along said combination, said tongue being closely spaced from said combination so that the air jet velocity is increased to remove excess water from the surface of said combination.

* * * * *

UNITED STATES PATENT AND TRADEMARK OFFICE
CERTIFICATE OF CORRECTION

PATENT NO. : 4,358,334
DATED : November 9, 1982
INVENTOR(S) : Thomas A. Sutrina and Douglas Behr It is certified that error appears in the above—identified patent and that said Letters Patent is hereby corrected as shown below:

Col. 1, line 24, "This" should read -- That --;

Col. 3, line 19, "the grooved" should read -- a grooved --;

Col. 5, line 2, "94" should read -- 84 --;

Col. 6, line 46, "0.008" should read -- .0008 --;

Col. 8, line 9, "prevent" should read -- present --.

Signed and Sealed this

Sixth Day of September 1983

[SEAL]

Attest:

GERALD J. MOSSINGHOFF

Attesting Officer     Commissioner of Patents and Trademarks